United States Patent
Kim et al.

(10) Patent No.: US 10,225,139 B2
(45) Date of Patent: Mar. 5, 2019

(54) SELF-ORGANIZING NETWORK (SON) SYSTEM AND OPERATING METHOD OF THE SAME

(71) Applicant: ELECTRONICS AND TELECOMMUNICATIONS RESEARCH INSTITUTE, Daejeon (KR)

(72) Inventors: Hong Soog Kim, Daejeon (KR); Jee Hyeon Na, Daejeon (KR); Sang Chul Oh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 61 days.

(21) Appl. No.: 15/414,728

(22) Filed: Jan. 25, 2017

(65) Prior Publication Data

US 2017/0230240 A1    Aug. 10, 2017

(30) Foreign Application Priority Data

Feb. 5, 2016    (KR) .......................... 10-2016-0015189

(51) Int. Cl.
| | | |
|---|---|---|
| H04B 7/212 | (2006.01) |
| H04L 12/24 | (2006.01) |
| H04W 24/02 | (2009.01) |
| H04L 12/26 | (2006.01) |
| H04W 88/08 | (2009.01) |

(52) U.S. Cl.
CPC .......... H04L 41/0803 (2013.01); H04L 43/10 (2013.01); H04W 24/02 (2013.01); *H04W 88/08* (2013.01)

(58) Field of Classification Search
USPC ........ 370/252, 235, 217, 254, 328, 332, 345, 370/503
See application file for complete search history.

(56) References Cited

U.S. PATENT DOCUMENTS

| | | | |
|---|---|---|---|
| 9,166,875 B2 | 10/2015 | Mishra et al. | |
| 2009/0024725 A1* | 1/2009 | Bernard | H04L 41/00 709/223 |
| 2013/0150023 A1 | 6/2013 | Kim et al. | |
| 2013/0189996 A1* | 7/2013 | Sridhar | H04W 36/0083 455/444 |
| 2014/0198635 A1 | 7/2014 | Han et al. | |
| 2014/0200004 A1 | 7/2014 | Wegmann et al. | |

FOREIGN PATENT DOCUMENTS

| | | |
|---|---|---|
| KR | 10-2015-0106422 A | 9/2015 |
| WO | 2014/122706 A1 | 8/2014 |

* cited by examiner

*Primary Examiner* — Phuongchau Ba Nguyen
(74) *Attorney, Agent, or Firm* — LRK Patent Law Firm (57) ABSTRACT

A self-organizing network (SON) and an operating method of the SON. An operating method of a base station in the SON includes receiving a parameter setting message including a first version identification (ID) and setting values of parameters, storing the setting values to match the first version ID, and setting parameters of the base station based on the setting values.

3 Claims, 7 Drawing Sheets

SELF-ORGANIZING NETWORK (SON) SYSTEM AND OPERATING METHOD OF THE SAME

CROSS-REFERENCE TO RELATED APPLICATION

This application claims the benefit of Korean Patent Application No. 10-2016-0015189, filed on Feb. 5, 2016, in the Korean Intellectual Property Office, the disclosure of which is incorporated herein by reference.

BACKGROUND

1. Field of the Invention

One or more example embodiments relate to a self-organizing network (SON) system and an operating method of the SON system.

2. Description of Related Art

A self-organizing network (SON) may monitor key performance index (KPI) values indicating a performance state of a network periodically or using an event-driven scheme. When a performance is reduced, network settings may be changed to optimal setting values derived by performing an optimization algorithm, to enhance a network performance.

Figure 1:
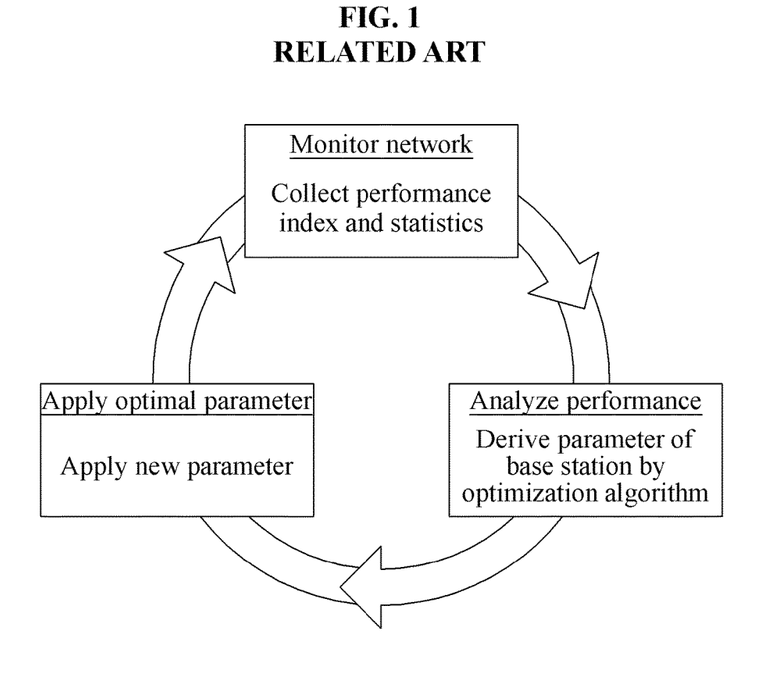
FIG. 1 illustrates a process of updating a network setting value in a self-organizing network (SON) according to a related art.

FIG. 1 illustrates a process of updating a network setting value in a SON according to a related art.

In the SON, an optimal setting value derived by performing an optimization algorithm may be used to enhance a network performance. However, when the optimal setting value is not appropriate, the network performance may decrease instead of increasing. In this example, a degradation of the performance may need to be at least prevented by cancelling a new optimal setting value and by performing a recovery to a previous optimal setting value.

In the related art, to canceling immediately a new optimization setting that causes a degradation of a network performance and to perform resetting in a base station cell with an optimization setting value at a point in time for quick recovery to a previous network setting state, an optimization setting value at a recovery time may be retransmitted to all the same base station cells.

However, in a case of a large quantity of data during the retransmitting of the optimization setting value at the recovery time, an issue may occur in an instant recovery due to a delay.

SUMMARY

An aspect is to solve a delay problem due to a retransmission of a previous optimization setting value. Example embodiments may provide a server and an operating method of the server that may store existing optimization setting values in a cache while setting a new optimization setting value in a base station cell level, may immediately cancel an optimization setting that causes a degradation of a performance in a self-organizing network (SON), and may minimize an optimization setting recovery time based on a message structure for a quick recovery to a network setting state immediately before the optimization setting.

According to an aspect, there is provided an operating method of a base station in an SON, including receiving a parameter setting message including a first version identification (ID) and setting values of parameters, storing the setting values to match the first version ID, and setting parameters of the base station based on the setting values.

The operating method may further include receiving a parameter recovery message including a second version ID, extracting setting values corresponding to a recovery time based on the second version ID, and setting the parameters of the base station based on the extracted setting values.

The extracting of the setting values may include extracting a version ID with a maximum value among values less than or equal to a value of the second version ID from values of pre-stored version IDs, and extracting setting values that are stored to match the extracted version ID.

The parameter setting message may include a previous version ID corresponding to a previous point in time of the first version ID.

The base station may be connected to an element management system (EMS) that is an upper management system through a TR-069 protocol.

According to another aspect, there is provided an operating method of a management system in an SON, including receiving a parameter setting message from a server, the parameter setting message including a first version ID, at least one cell ID and setting values of parameters corresponding to each of the at least one cell ID, extracting first cell IDs from the setting values, and transmitting detailed parameter setting messages corresponding to the first cell IDs in the parameter setting message to base stations to which the first cell IDs are to be transmitted.

According to another aspect, there is provided an operating method of a server in an SON, including generating a parameter setting message including a first version ID and setting values of parameters, transmitting the parameter setting message to a lower management system, receiving data collected by the lower management system, generating a parameter recovery message including a second version ID based on the data, and transmitting the parameter recovery message to the lower management system.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting of the example embodiments. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in describing of example embodiments, detailed description of well-known related structures or functions will be omitted when it is deemed that such description will cause ambiguous interpretation of the present disclosure.

In existing $2^{nd}$ generation (2G) and/or $3^{rd}$ generation (3G) wireless networks, parameters associated with a large number of network components are manually set. Functions of designing, setting, integrating and managing network components and parameters associated with the network components are very important for an efficient and reliable network operation.

However, the above network parameters may need to be manually adjusted by professional engineers. The above manual process may require a relatively large amount of time and may be likely to potentially cause an error.

Due to a visualization of a femtocell and an introduction of a next generation, for example, a $4^{th}$ generation (4G), in a mobile communication system, a self-organizing network (SON) technology including an automation function, for example, self-configuration, self-optimization or self-healing, has been used in a process of installing and operating base stations.

The SON technology may include an inter-cell interference coordination (ICIC) function of minimizing an interference between base stations based on traffic type information and signals between neighboring base stations, a cell outage compensation (CCO) function for a coverage and an optimal capacity to detect a coverage hole, a random-access-channel optimization (RO) function for optimally using a random access channel (RACH), a multi-layer board (MLB) function for uniformly adjusting loads between neighboring base stations, a maintenance, repair and operation (MRO) function for optimizing a handover parameter to minimize an radio link failure (RLF) during a handover, and an energy saving (ES) function for reducing power by minimizing an unnecessary base station operation time, during operating of base stations.

Figure 2:
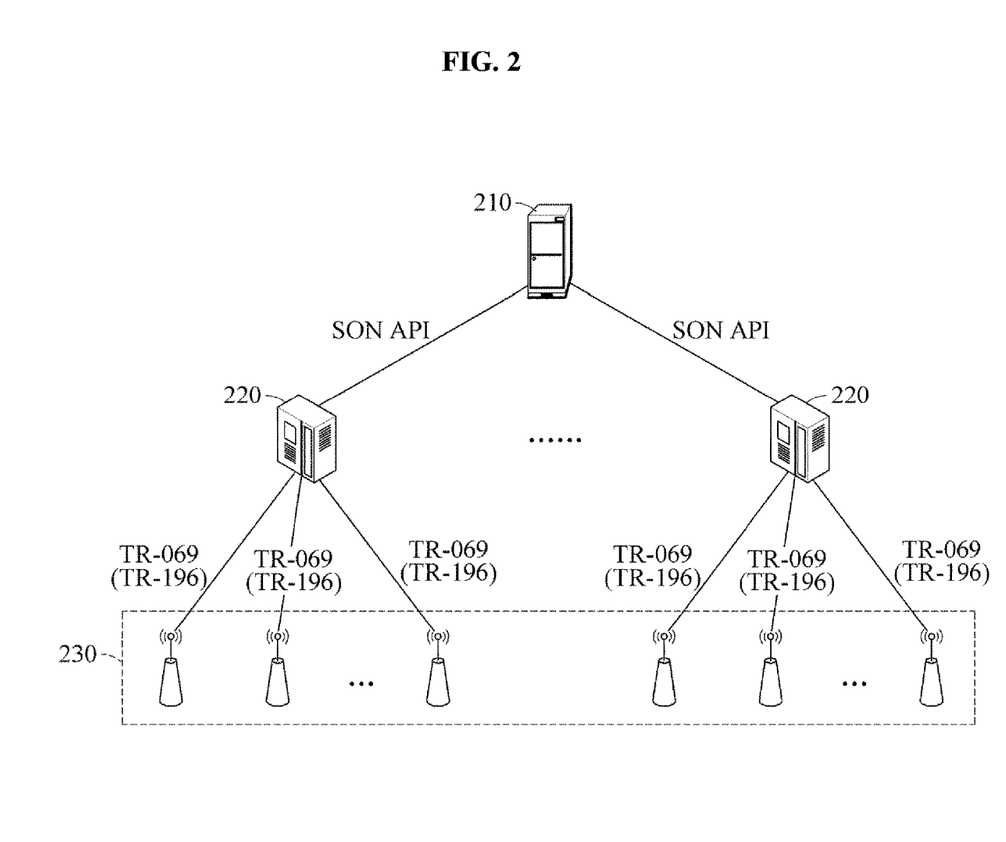
FIG. 2 is a diagram illustrating a structure of a SON according to an example embodiment.

FIG. 2 is a diagram illustrating a structure of a SON according to an example embodiment.

Generally, network components associated with a function of a server 210 may have a connection structure of FIG. 2. eNodeBs (eNBs)/home eNBs (HeNBs) that are base stations 230 for a wireless connection to a terminal are connected via a wire to an element management system (EMS)/home element management system (HeMS) (hereinafter, referred to as a "management system 220") configured to perform an operations, administration, and maintenance (OAM) function. The server 210 corresponding to an upper layer of the management system 220 may be connected to the management system 220, and may perform a parameter optimization function of each of the base stations 230.

A connection interface of FIG. 2 may include, for example, a TR-196 data model of a TR-069 interface of the Broadband Forum used between the management system 220 and the base stations 230, and a SON application programming interface (API) of the Small Cell Forum used between the server 210 and the management system 220.

To set optimal parameters of the base stations 230 in a network operation process, a self-organizing function may be performed in the server 210. The server 210 may repeat a process of deriving optimal network parameters by analyzing a performance based on a network environment change and of applying the optimal network parameters to a network while periodically monitoring network performance indices and statistics collected from the base stations 230 through the OAM function.

Data for network performance indices and statistics may be generated in the base stations 230 and may be collected in an OAM module of the management system 220 through the TR-196 data model of the TR-069 interface. The OAM module of the management system 220 may process the collected data, may generate network performance indices and statistics, and may report the network performance indices and statistics to the server 210 through the SON API periodically or in response to receiving a request of the server 210.

The server 210 may repeat a process of deriving new optimal parameters by performing an optimization algorithm based on the network performance indices and statistics received from the OAM module of the management system 220 and of applying the new optimal parameters to the base stations 230 through the management system 220.

A network performance may be enhanced by applying an optimal parameter derived by the server 210. However, when an incorrect optimal parameter is applied, the network performance may be reduced. In this example, returning to an immediately previous parameter setting may be performed or other optimal parameter setting values may be transmitted, to instantly recover the network performance.

Figure 3:
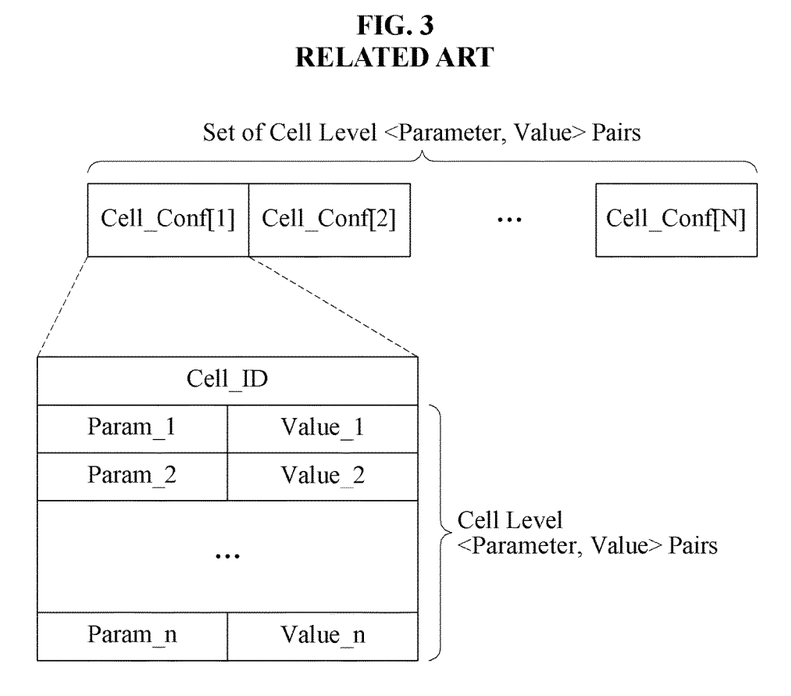
FIG. 3 is a diagram illustrating a structure of an existing optimized parameter setting message according to a related art.

FIG. 3 illustrates a structure of an existing optimized parameter setting message according to a related art.

FIG. 3 illustrates a structure of an optimized or initial parameter setting value transferred from a server to a management system through an existing SON API.

Figure 5:
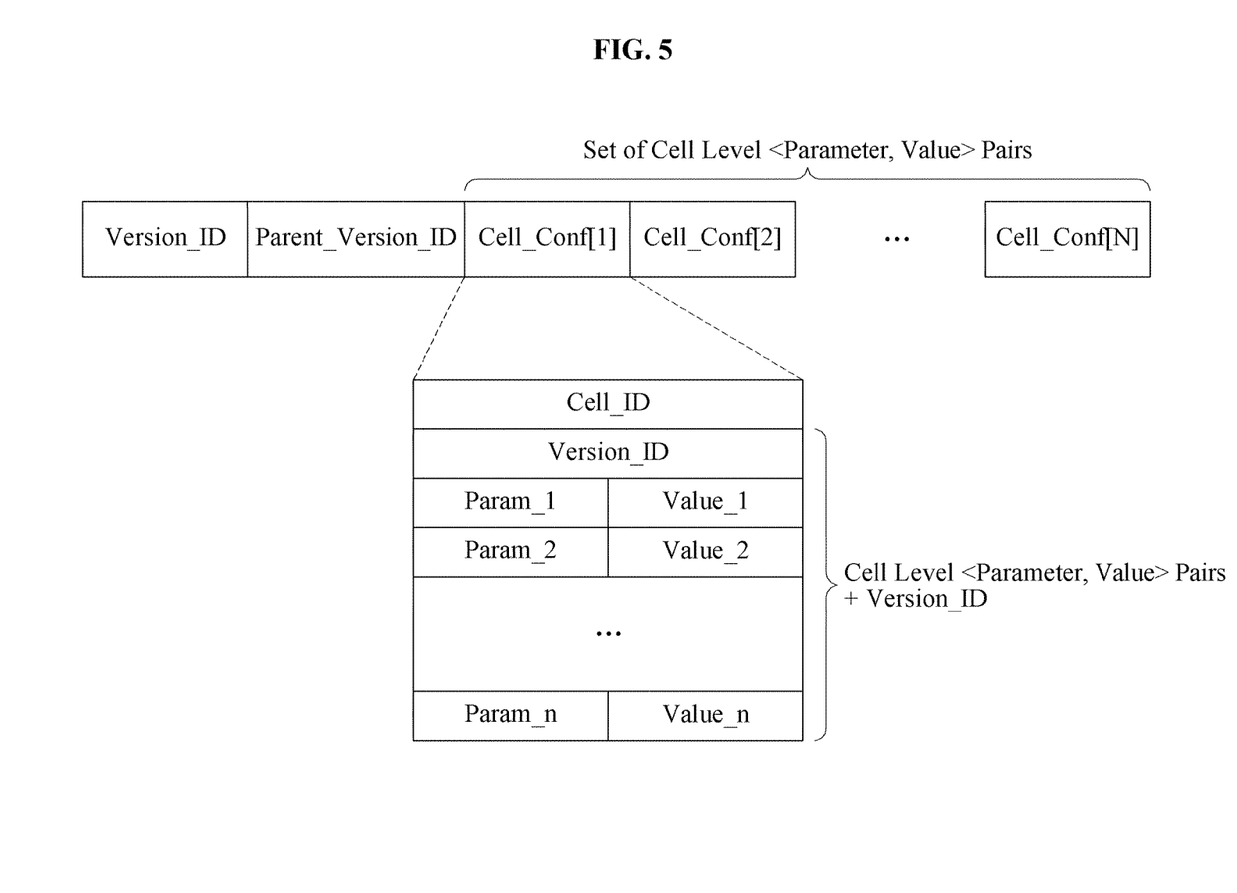
FIG. 5 is a diagram illustrating a structure of a parameter setting message including version information according to an example embodiment.

A management system may transmit, to a base station through a TR-196 data model of a TR-069 interface, parameter setting values of cell levels in a set of parameter setting values of all cells that are included in a network and that are received from the server. The base station may verify cell identifications (IDs) Cell_ID and control the cells. In FIGS. 3 and 5, the set of the parameter setting values of all the cells may be represented by "Set of Cell Level<Parameter, Value> Pairs."

In an existing structure, to cancel setting of applying sets of the parameter setting values of all the cells determined and transmitted by an optimization algorithm in the server, and to perform a recovery to a setting value at a specific point in time, sets of parameter setting values of all cells at the specific point in time may need to be retransmitted.

Applying of the sets of the parameter setting values of all the cells may be cancelled when optimal values are incorrectly determined by the optimization algorithm and a network performance rapidly decreases or a network frequently malfunctions during a network operation using the optimal values.

Due to a characteristic of an optimization operation, sets of parameter setting values of all cells optimized for the entire network may need to perform an atomic operation. However, when a portion of the cells fails to apply received parameter setting values of cell levels, the other cells may need to cancel parameter setting values of cell levels of the other cells which have been applied or being applied.

Figure 4:
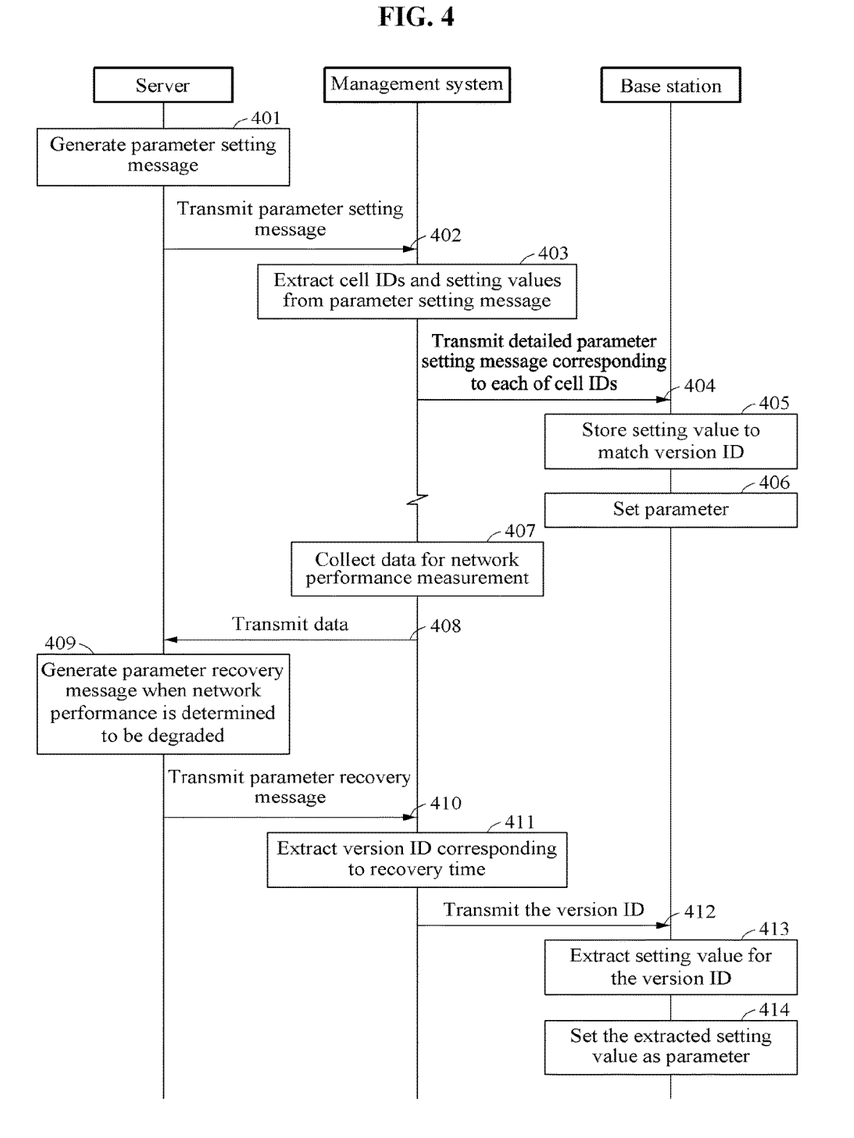
FIG. 4 is a flowchart illustrating an operating method of each of components in a SON according to an example embodiment.

FIG. 4 is a flowchart illustrating an operating method of each of components in a SON according to an example embodiment.

Referring to FIG. 4, in operation 401, a server may generate a parameter setting message. The parameter setting message may include parameter setting information of each of base stations and version information of a set of parameter setting values in a message structure, for example, the structure of FIG. 3. The version information may have a value counted and incremented every time a parameter setting message is generated, and will be further described below.

In operation 402, the server may transmit the parameter setting message to at least one management system. For example, a SON API of the Small Cell Forum may be used.

In operation 403, the management system may extract cell IDs and setting values from the received parameter setting message. For example, base stations corresponding to the cell IDs included in the parameter setting message may be classified, parameter setting values of cell levels may be classified by verifying the cell IDs, and a detailed parameter setting message that is to be transmitted to each of the base stations may be generated.

In operation 404, the management system may transmit a detailed parameter setting message corresponding to each of the cell IDs to a base station. For example, a TR-196 data model of a TR-069 interface may be used to transmit a message to each of the base stations.

In operation 405, the base station may store a setting value so that the setting value may match a version ID included in the detailed parameter setting message received from the management system. For example, the setting value may be stored in a form of a table or in an internal memory.

In operation 406, the base station may set a parameter of the base station based on a parameter setting value.

In operation 407, the management system may collect data for measurement of a network performance. For example, an OAM module of the management system may collect data from a base station connected to the management system at regular intervals or at a request of the server.

In operation 408, the management system may transmit the collected data to the server.

In operation 409, the server may analyze the collected data and may determine the network performance. When the network performance is determined to be degraded, a parameter recovery message may be generated. The parameter recovery message may refer to a message including a version ID corresponding to a recovery time at which a parameter is recovered in a base station.

In operation 410, the server may transmit the parameter recovery message to the management system.

In operation 411, the management system may extract the version ID corresponding to the recovery time. The parameter recovery message may include the version ID, and the management system may determine that the parameter recovery message is a message including the version ID.

In operation 412, the management system may transmit the version ID to the base station.

In operation 413, the base station may extract a pre-stored setting value corresponding to the version ID. When a setting value corresponding to the version ID included in the received parameter recovery message is extracted or is not stored in advance, a setting value corresponding to a version ID with a highest value among values less than a value of the version ID may be extracted.

In operation 414, the base station may set the extracted setting value as a parameter of the base station, to perform a parameter recovery by a degradation of the network performance.

FIG. 5 is a diagram illustrating a structure of a parameter setting message including version information according to an example embodiment.

To quickly process the above-described instant recovery, metadata including version information may be added to each of sets of parameter setting values, and a quick recovery and resetting may be enabled through an operation and a cache in a level of a management system and a base station for a set of setting values for each version.

The structure of the parameter setting message of FIG. 5 may be configured by adding Version_ID and Parent_Version_ID as meta information to a structure of an existing parameter setting message. Parent_Version_ID may indicate a previous version ID.

Version_ID may be an ID used to identify sets of parameter setting values of all cells applied in a network operation process based on version information assigned to each of the sets.

Version_ID included in a parameter setting value of a cell level may have the same value as that of Version_ID included in the set of the parameter setting values of all the cells. The parameter setting value of the cell level may be represented by "Cell Level<Parameter, Value> Pairs" as shown in FIG. 5.

Also, Parent_Version_ID may correspond to information indicating a version ID of a version immediately before a set of parameter setting values of all cells verified by Version_ID is applied. Based on Parent_Version_ID, an order of sets of parameter setting values of all the cells may be determined.

During an initial setup of a network, Parent_Version_ID may have the same value as that of Version_ID in a set of parameter setting values of all used cells. After the initial setup, a version ID of a previous version may be set as a previous version ID based on an order.

Cell_ID included in the parameter setting value of the cell level may be an ID to identify a cell to which the parameter setting value is to be transmitted.

The management system may verify Cell_ID and may transmit the parameter setting value to a base station HeNB that manages a cell corresponding to Cell_ID.

Figure 6:
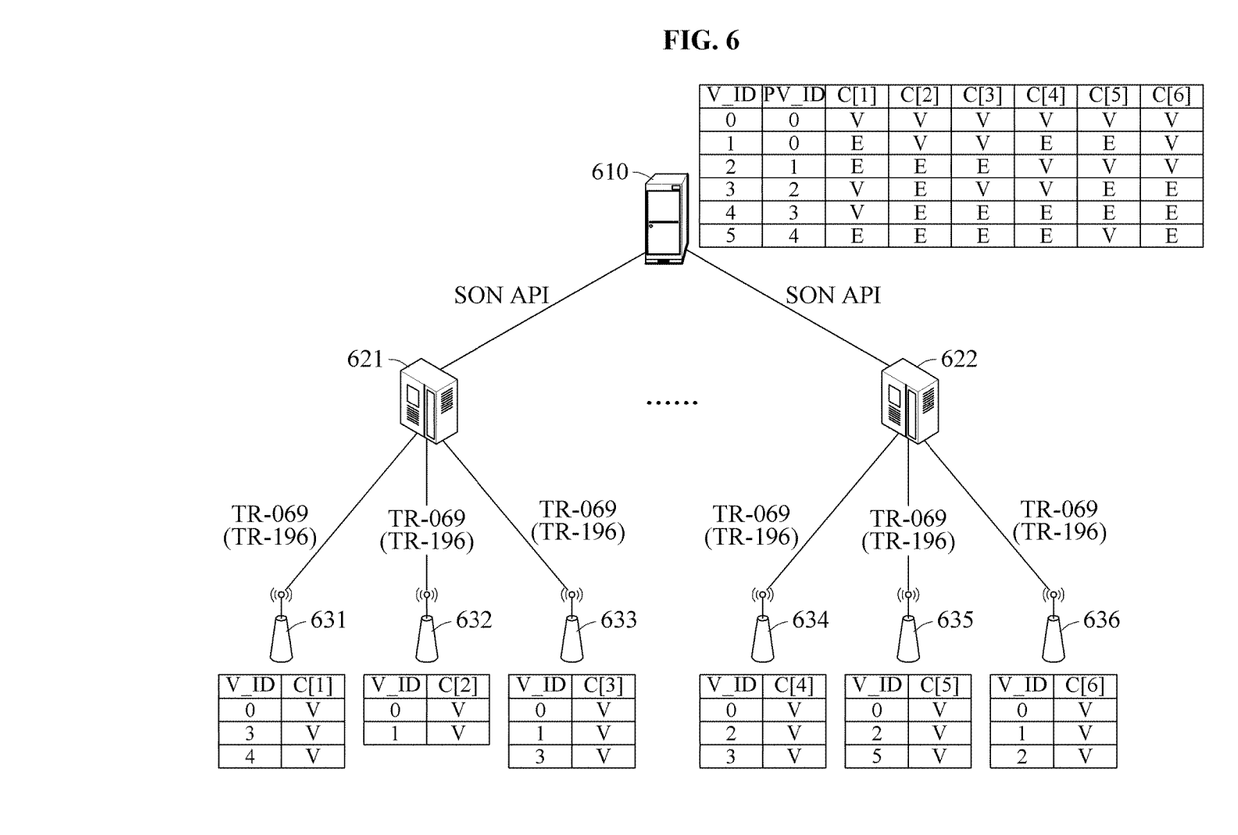
FIG. 6 is a diagram illustrating an example of a parameter setting change history in a SON according to an example embodiment.

FIG. 6 is a diagram illustrating an example of a parameter setting change history in a SON according to an example embodiment.

For a recovery process using version ID V_ID and previous version ID PV_ID in a set of parameter setting values of all cells, a structure in which six base stations 631, 632, 633, 634, 635 and 636 and two management systems 621 and 622 are connected to a SON server 610 may be used as shown in FIG. 6. For convenience of description, a single cell may be assumed to operate for each of base stations, however, there is no limitation thereto. For example, at least two cells may operate for a single base station, because the at least two cells may be identified by Cell_ID included in the parameter setting value of the cell level of FIG. 5.

In a table shown in a top portion of FIG. 6, a single row may indicate a version of a set of parameter setting values of all cells set by the server 610. For example, a row with V_ID of 0 and PV_ID of 0 may indicate a set of parameter setting values of all cells applied at a time t0 corresponding to a network initialization. In this example, initial values of all cells managed by the management systems 621 and 622 controlled by the server 610 may need to be designated, and accordingly the cells may have setting values indicated by "V" in the table.

A row with V_ID of 1 and PV_ID of 0 may indicate a set of parameter setting values of all cells that are calculated by an optimization algorithm in the server 610 after a version of a set of parameter setting values of all cells in a row with V_ID of 1 in an order is applied, and that are to be applied at a time t1. For cells with Cell_ID of 1, 4 and 5, the parameter setting values applied at the time t0 may be used without a change among the parameter setting values calculated by the optimization algorithm, which is indicted by "E" in the table. For cells with Cell_ID of 2, 3 and 6, new parameter setting values may be calculated instead of the parameter setting values applied at the time t0. For example, when there is no change by a comparison to an immediately previous version, the same value may be omitted instead of being transmitted separately, and a message size may be reduced.

When the above-described process is applied to a set of parameter setting values of all cells calculated by the optimization algorithm at each of times t0, t1, t2, t3, t4 and t5, setting values for each version may be maintained in the base stations 631 through 636 as shown in tables of a bottom portion of FIG. 6 after the time t5.

For example, the base station 631 may have parameter setting values of cell levels corresponding to V_ID of 0, 3 and 4, and a parameter setting value of a cell level corresponding to V_ID of 4 may be applied at the time t5. A version of parameter setting values in the entire network at the time t5 may have V_ID of 5, however, a version with V_ID of 4 and the version with V_ID of 5 may not be different from each other. Accordingly, the parameter setting values of the base station 631 may have the version with V_ID of 4.

Figure 7:
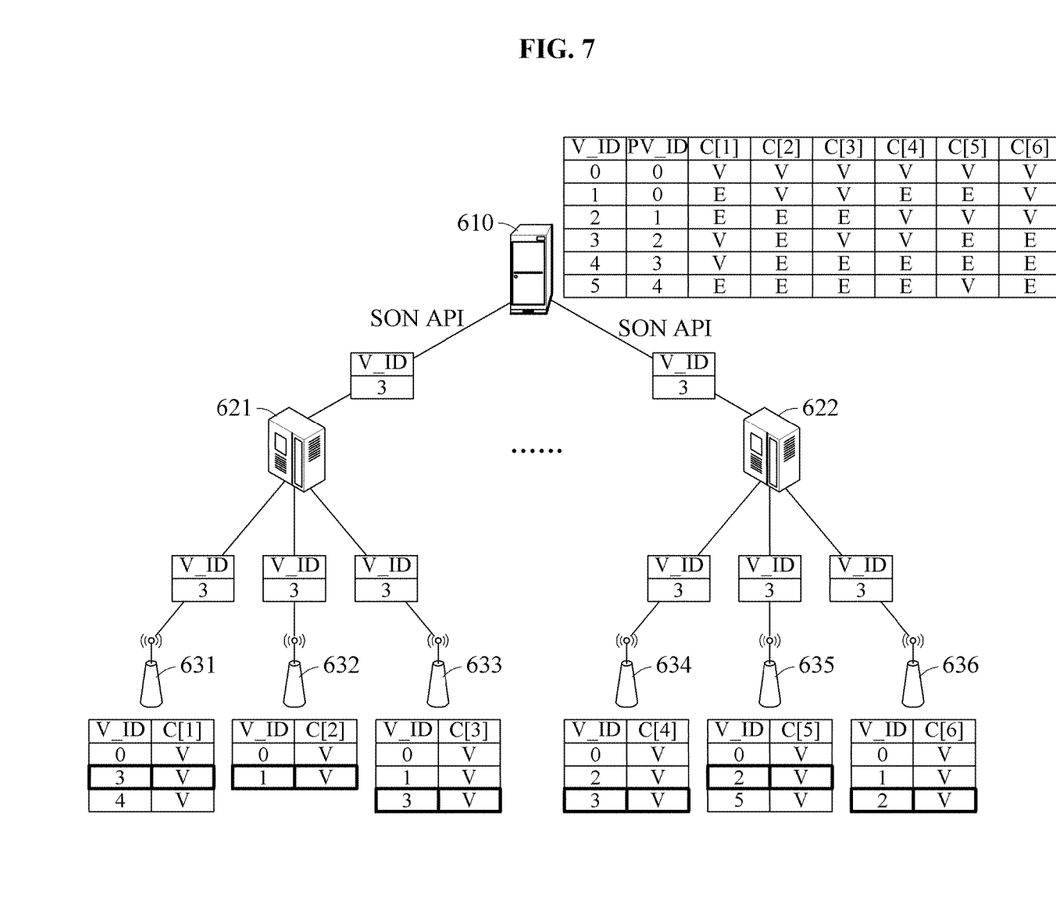
FIG. 7 is a diagram illustrating an example of a recovery to setting included in a parameter recovery message according to an example embodiment.

FIG. 7 is a diagram illustrating an example of a recovery to setting included in a parameter recovery message according to an example embodiment. When a degradation of a performance is determined in the parameter setting change history of FIG. 6, a parameter may be recovered.

For example, the server 610 may determine a sharp degradation of the performance based on a performance index or statistics index while using parameter setting values of all cells applied at the time t5, or it may be impossible to perform an atomic operation because the parameter setting values applied at the time t5 are not applied to at least one cell. In this example, a recovery to a previous state or a state at a specific point in time may need to be performed.

FIG. 7 illustrates an example of a process of determining that an overall network performance is reduced by the parameter setting values applied at the time t5 in the server 610 and of performing a recovery to a parameter setting value corresponding to V_ID of 3 applied at the time t3. For example, it is possible to perform a recovery to a parameter setting value applied at another time instead of the time t3.

For the recovery to the parameter setting value corresponding to V_ID of 3 at the time t3, the server 610 may not need to retransmit all setting values of a row with V_ID of 3 and PV_ID of 2, and the base stations 631 through 636 may store, in advance, setting values corresponding to a version with V_ID of 3. Accordingly, the server 610 may transmit a parameter recovery message with V_ID of 3. When parameter setting values of a cell level are not included in a received parameter recovery message, the management systems 621 and 622 may transmit the received parameter recovery message to all the base stations 631 through 636 without a change.

When the parameter recovery message with V_ID of 3 is received, each of the base stations 631 through 636 may retrieve setting values corresponding to V_ID of 3 from a local cache of each of the base stations 631 through 636, and may apply the retrieved setting values with a change. When the setting values corresponding to V_ID=3 are not retrieved, each of the base stations 631 through 636 may retrieve a maximum setting value among setting values less than a setting value corresponding to designated V_ID and may apply the retrieved maximum setting value.

In an example, the base station 632 may apply a parameter setting value corresponding to V_ID of 1, because a maximum value among values less than "3" as V_ID is "1." In this example, the same version as a version with V_ID of 3 may be used, because parameter setting values at the times t3, t4 and t5 may not change when the base station 632 applies a parameter setting value corresponding to V_ID of 0 at the time t0 and applies a parameter setting value corresponding to V_ID of 1 at the time t1. Accordingly, logically, a parameter setting value corresponding to V_ID of 2 at the time t2, a parameter setting value corresponding to V_ID of 3 at the time t3, a parameter setting value corresponding to V_ID of 4 at the time t4, and a parameter setting value corresponding to V_ID of 5 at the time t5 may be physically the same.

In another example, the base station 635 may apply a parameter setting value corresponding to V_ID of 2 in a local cache, and the base station 636 may also apply the parameter setting value corresponding to V_ID of 2 in a local cache. Each of the base stations 631, 633 and 634 may apply the parameter setting value corresponding to V_ID of 3 because the parameter setting value corresponding to V_ID of 3 is stored in a local cache of each of the base stations 631, 633 and 634.

The above process may enable a quick recovery to parameter setting values corresponding to V_ID of 3 at the time t3 in the entire network. When a version ID and a local cache are absent, parameter setting values of all cells at the time t3 may need to be retransmitted. In comparison to the above scheme, a size of a message generated in a situation in which optimized parameters are applied and recovered using a version ID and a local cache added may be reduced, and a recovery process may be quickly performed.

According to example embodiments, existing optimization setting values may be stored in a cache while a new optimization setting value is set in a base station cell level, and an optimization setting that causes a degradation of a performance of a SON may be immediately cancelled, and an optimization setting recovery time may be minimized based on a message structure for a quick recovery to a network setting state immediately before the optimization setting.

For example, when a performance of an SON in the related art is degraded after an optimization operation, an optimization setting that cause a degradation of the performance may be immediately cancelled, and a quick recovery to a network setting state corresponding to a specific point in time may be performed while minimizing a quantity of data transmitted for the recovery.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The above-described example embodiments may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optimal media such as CD-ROM discs, DVDs, and/or Blue-ray discs; magneto-optimal media such as optimal discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of a base station in a self-organizing network (SON), the operating method comprising:
   receiving a parameter setting message comprising a first version identification (ID) and setting values of parameters;
   storing the setting values to match the first version ID; and
   setting parameters of the base station based on the setting values;
   receiving a parameter recovery message comprising a second version ID in response to degraded performance of the self-organizing network after an optimization operation;
   extracting previously stored setting values based on the second version ID;
   setting the parameters of the base station based on the extracted previously stored setting values;
   wherein the extracting of the previously stored setting values comprises:
   extracting a version ID with a maximum value among values less than or equal to a value of the second version ID from values of pre-stored version IDs; and
   extracting setting values that are stored to match the extracted version ID.

2. The operating method of claim 1, wherein the parameter setting message comprises a previous version ID corresponding to a previous point in time of the first version ID.

3. The operating method of claim 1, wherein the base station is connected to an element management system (EMS) that is an upper management system through a TR-069 protocol.

* * * * *